United States Patent [19]
McLinden, Jr.

[11] 3,771,115
[45] Nov. 6, 1973

[54] SIMULATED SUBMARINE TARGET APPARATUS

[76] Inventor: Hugh F. McLinden, Jr., 1077 Second Ave., Clula Vista, Calif.

[22] Filed: Jan. 4, 1966

[21] Appl. No.: 518,731

[52] U.S. Cl............ 340/5 D, 114/0.5 R, 181/0.5 A, 340/8 FT
[51] Int. Cl. .......................................... H04b 11/00
[58] Field of Search...................... 181/0.5 A; 340/5, 340/5 D, 8 RT; 343/18 B; 114/0.5 R

[56] References Cited
UNITED STATES PATENTS
2,954,750  10/1960  Crump et al.......................... 181/0.5
FOREIGN PATENTS OR APPLICATIONS
855,375  11/1952  Germany ............................... 340/5

Primary Examiner—Richard A. Farley
Attorney—G. J. Rubens and A. L. Branning

[57] ABSTRACT

A countermeasure device for submarines intended to interfere with and jam active sonar ranging by an enemy. A viscous, gelatinous material having metallic particles suspended through it, is ejected by the submarine in such a manner that it forms a hollow bag-like structure which is filled with water. The structure has substantially the same specific gravity as seawater so that it will float at whatever depth it is placed and in so doing will give the same sonar response as a real submarine.

4 Claims, 7 Drawing Figures

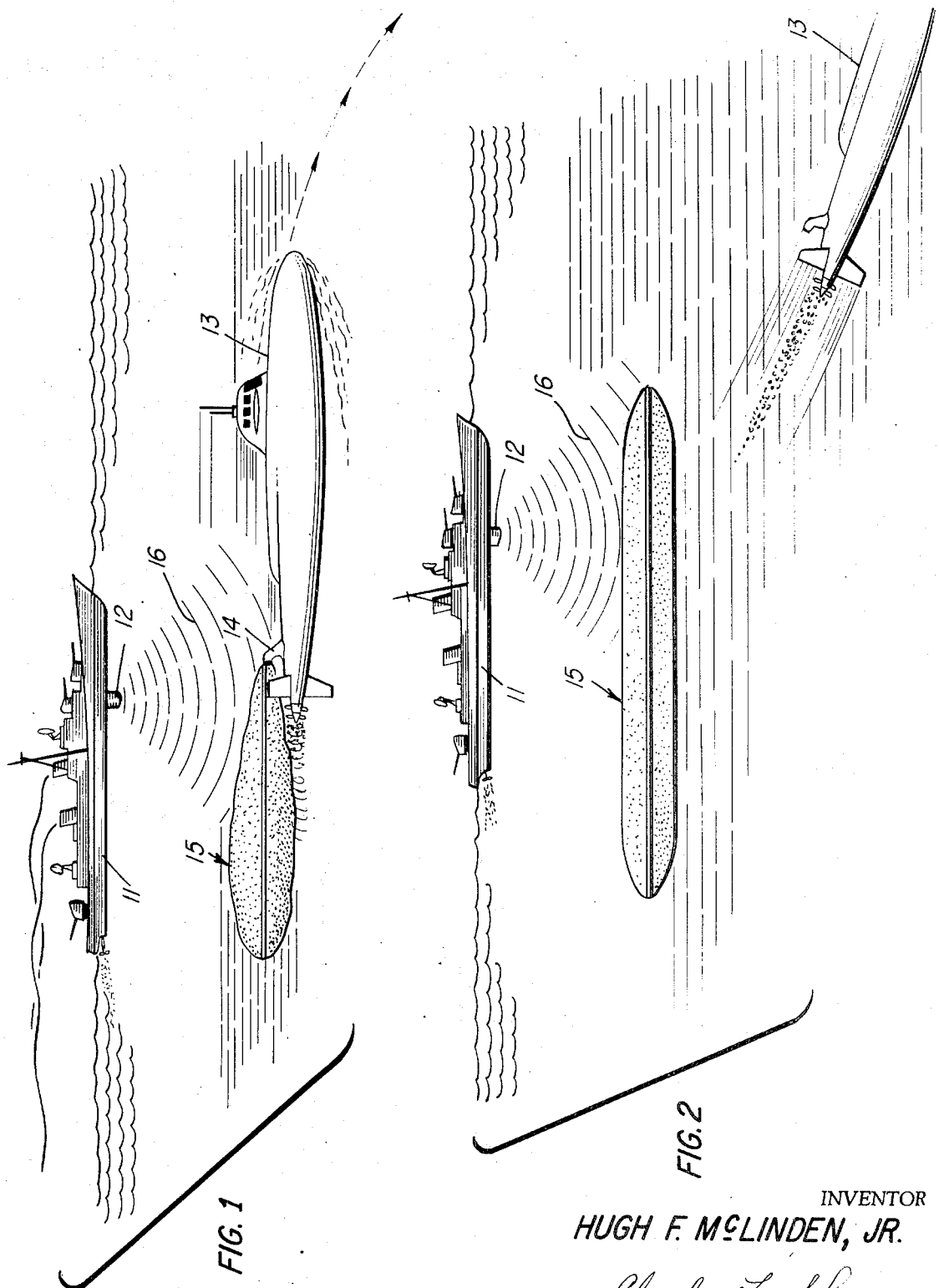

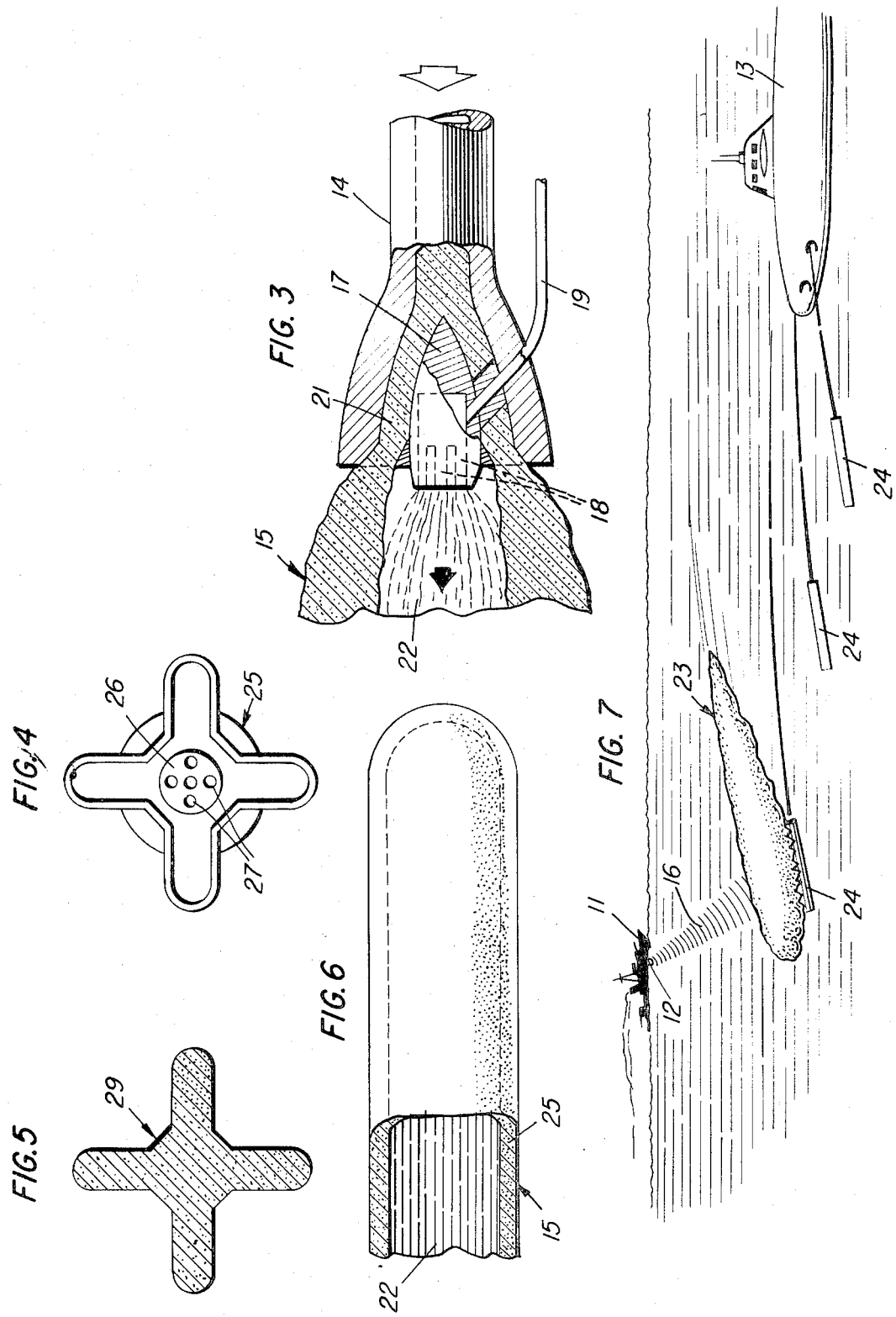

SIMULATED SUBMARINE TARGET APPARATUS

The invention described herein may be manufactured and used by or for the Government of the United States of America for governmental purposes without the payment of any royalties thereon or therefor.

This invention relates to anti-submarine detection devices and more particularly to a technique and apparatus for creating a submerged object that will cause a sonar pulse to be reflected with the same characteristic sound echo as that which would return from a submarine.

Sonar technqiues are widely used in various military and non-military applications. In military applications, especially in Naval warfare, it is used by surface ships to detect submerged submarines and also by the submerged submarine to detect surface ships. Presently, there are two types of sonar methods in common use; the active system and the passive system. Since the disclosed invention is only useful with an active sonar system, only the general operation of active sonar apparatus is discussed below. An active sonar apparatus generates a sound pulse that is transmitted via the medium of water to the target. This sound pulse is reflected back from the target and detected by the sonar apparatus as an echo pulse. The range and bearing of the target then may be determined and in many cases the echo return has characteristics which may permit an experienced sonar operator to recognize the returned pulse as a submarine as distinguished from other submerged objects such as schools of fish, wrecks, or ocean floor discontinuities. Because of the continuing sophistication of sonar detection apparatus there is a military need for an anti-submarine detection countermeasure device that will enable a submarine to evade detection once it has been located by a search sonar of a surface ship. Prior art techniques for providing cover for a submarine located by search sonar usually are in the form of a specially designed torpedo that is fired from the submarine. This torpedo has sound sensing apparatus aboard that amplifies the sound pulse received from the search sonar and sends back a simulated echo pulse that has the characteristic of a submarine return echo. Other prior art techniques use mechanical targets that are ejected from the submarine torpedo tubes and these false target devices either inflate or unfold and present a simulated target to the sonar apparatus.

The apparatus of the present invention allows the submarine to create a multiplicity of individual targets for sonar detection. This is accomplished by a specially designed nozzle that permits the submarine once it has been detected by the search sonar to eject a gelatinous material which has suspended therein metallic particles. This gelatinous material may be inflated with a fluid to control its density and to provide a shape somewhat similar to that of a submarine or may be formed of a shape and size that returns an echo pulse efficiently. The size of the target formed is variable and may be predetermined or it may be any size so desired. This technique allows the submerged submarine to create as many false targets as feasible under various attack conditions so that it may escape by destroying the tracking and bearing capabilities of the sonar detection apparatus of the surface ship.

An object of the present invention is to provide a submarine with an apparatus that allows it to evade sonar detection.

Another object of the present invention is to provide a simple, economical and foolproof technique for a submarine to release a false sonar target.

Another object of the present invention is to provide a submarine tht has been detected by a search sonar with an apparatus to release false sonar targets in order to evade the search sonar.

A further object of the present invention is to provide a simulated sonar target that has an echo return that has the same characteristics as that returned by a submarine.

Another object of the present invention is to provide a false target apparatus that may be used to avoid detection of a submarine by an active sonar system.

Still another object of the present invention is the provisions of an apparatus for a submarine that permits the submarine to release a multiplicity of sonar targets whenever the submarine is under attack by a surface vessel in order to confuse and possibly destroy the sonar tracking and ranging capabilities of the surface ship sonar apparatus.

Other objects, advantages and novel features of the invention will become apparent from the following detailed description of the invention when considered in conjunction with the accompanying drawings wherein:

FIG. 1 illustrates a submarine that has been detected by search sonar apparatus on a surface ship;

FIG. 2 illustrates the technique the submarine uses to confuse the sonar operator in order to allow it to escape;

FIG. 3 shows a detail section of the type of nozzle used to form a bag like sonar target;

FIG. 4 illustrates a nozzle that may be used to form cruciform shaped sonar targets;

FIG. 5 illustrates the shape of the object formed by the cruciform nozzle;

FIG. 6 shows a section for the sonar target wall; and

FIG. 7 illustrates another embodiment of the invention where sonar targets are enclosed in separate containers.

With reference to FIG. 1, which shows the preferred embodiment of the invention, there is illustrated a surface ship 11 which has an active sonar detection apparatus 12 in searching operation. As shown, the sonar system 12 transmits sonic pulses 16 from the underside of the ship to search for submerged submarine 13. The submarine 13 by the use of sonar listening gear, known to those skilled in the art, detects the pulses 16 and realizes that it is being tracked. At this time, if desired, the submarine 13 starts to release a false sonar target 15 through nozzle 14. Nozzle 14 may be positioned at any convenient location on the submarine but for the purpose of illustration is shown as attached to the aft end of the submarine.

The false target 15 is composed of a gelatinous or viscious mass of material that is forced under pressure into a particular shape by nozzle 14. This gelatinous material may be any type that is stable in salt water and is cohesive enough to maintain the released shape for the sufficient time necessary to allow the submarine to escape from the vicinity of the surface ship. In order for the gelatinous material to present a submarine signature to the sonar operator of the search sonar system, it has suspended therethrough metallic particles to provide the necessary reflecting medium to sonar pulses. The false target may take the form of a large bag like structure 15 filled with a fluid such as air, water or gas or a cruciform shape as in FIG. 5. The insertion of a fluid to control the buoyancy may be done by a nozzle designed such as that shown by FIG. 3. Here the viscous material is forced through passageway 21 around a bullet shaped member 17. As viscous material 15 flows outwardly from the mouth of nozzle 14 it forms sides of a container, best shown in FIG. 6, for fluid 22 which is inserted under pressure by means of a multiplicity of tubular openings 18. The fluid fed to the tubular openings 18 may be conducted to them by means of tube 19.

The nozzle 14 may take another form such as that shown by FIG. 4. This nozzle 25 consists primarily of elements 26 and 27 and is used to extrude a cruciform shape. The nozzle 25 operates in much the same manner as nozzle 14 in that it produces a cruciform shape that is hollow and is filled with a fluid. If desired, by cutting off the fluid filling device 26, a solid cruciform shape 29 such as that shown in FIG. 5 may be obtained.

The operating technique of the submarine in evading the surface ship 11 is shown by reference to FIGS. 1 and 2. As surface ship 11 detects submarine 13 by means of its sonar equipment 12, the submarine picks up the sonar signals 16 and starts to eject metallic particles suspended as a gelatinous mass 15 through the nozzle 14 on its aft end. As the predetermined shape and size is obtained, as shown in FIG. 2, the submarine stops ejection, separates itself from the target and descends to a lower depth leaving the false target 15 floating at the depth as determined by its specific gravity. This characteristic is controlled by means of the filling fluid 22. The surface ship 11 detects and locates the false target and takes the necessary attack action to destroy what it believes is a submarine.

FIG. 7 shows another embodiment of the invention whereby the submarine 13 fires from its torpedo tubes can like containers 24. These containers may be static containers or propelled containers and upon a predetermined lapse of time after firing release a gelatinous mass of material which has therein metallic particles to form a shape as shown by element 23. A surface ship 11 by means of its active sonar system 12 tracks these false targets rather than the submarine. Meanwhile, the submarine either slips away undetected or uses the cover provided by the false targets to attack the surface ship 11.

The present invention provides an effective anti-submarine detection countermeasure device against detection of sonar and destruction of the submarine once detected by a surface vessel. The false targets released by the submarine presents a submarine signature to the sonar operator and thus the submarine is provided with a cover that has not been possible before. A suberged submarine under attack could release a plurality of targets which would thoroughly confuse the searching sonar and enhance the escape of the submarine from the surface vessel which has detected it by sonar.

Obviously many modifications and variations of the present invention are possible in the light of the above teachings. It is therefore to be understood that within the scope of the appended claims the invention may be practiced otherwise than as specifically described.

What is claimed is:

1. A method by which a submerged vehicle can form a false target for causing interference to activate sonar detection systems consisting of ejecting a gelatinous material having metallic particles suspended therein under pressure in a fluid environment;

inflating said gelatinous material into a hollow structure by insertion of a fluid as it is ejected; and detatching said structure upon its reaching a predetermined size whereby said hollow structure has substantially the same specific gravity of sea water thereby permitting it to float at the depth formed.

2. A false target apparatus for a submerged vehicle that is under search by an active sonar system which permits deployment of a multiplicity of targets that will provide return echoes that have the same characteristics as the echoes of said submerged vehicle for providing jamming of the search sonar comprising a viscous gelatinous material carried by the vehicle;

ejectment means operatively connected to said vehicle;

a projecting vent in the side of the vehicle connected to the ejectment means;

an extrusion nozzle located in the projecting vent; and injection means connected to the extrusion nozzle, whereby the ejection means releases the viscous material through the nozzle to form a bag-like structure while the injection means fills the bag-like structure with fluid.

3. The device of claim 2 wherein the viscous, gelatinous material has metallic particles suspended throughout.

4. The device of claim 3 wherein the extrusion nozzle has a cruciform configuration.

* * * * *